United States Patent
Oza et al.

(10) Patent No.: US 11,549,072 B1
(45) Date of Patent: Jan. 10, 2023

(54) OVERPRESSURE PROTECTION IN HOT HIGH PRESSURE PROCESSING SYSTEMS IN MULTI-STAGE UP-FLOW REACTOR SYSTEMS

(71) Applicant: Axens North America, Princeton, NJ (US)

(72) Inventors: Trushit Oza, Langhorne, PA (US); Yu-Hwa Chang, West Windsor, NJ (US)

(73) Assignee: Axens, Rueil-Malmaison (FR)

( * ) Notice: Subject to any disclaimer, the term of this patent is extended or adjusted under 35 U.S.C. 154(b) by 0 days.

(21) Appl. No.: 17/472,987

(22) Filed: Sep. 13, 2021

(51) Int. Cl.
| | |
|---|---|
| *C10G 47/26* | (2006.01) |
| *C10G 47/28* | (2006.01) |
| *C10G 47/30* | (2006.01) |
| *C10G 65/10* | (2006.01) |
| *B01J 19/00* | (2006.01) |

(52) U.S. Cl.
CPC ............ *C10G 65/10* (2013.01); *B01J 19/002* (2013.01); *B01J 2219/0027* (2013.01); *C10G 2300/4012* (2013.01)

(58) Field of Classification Search
CPC ........ C10G 47/26; C10G 47/28; C10G 47/30; C10G 65/10
See application file for complete search history.

(56) References Cited

U.S. PATENT DOCUMENTS

| | | |
|---|---|---|
| 5,916,529 A | 6/1999 | Scheuerman |
| 6,270,654 B1 | 8/2001 | Colyar et al. |
| 6,454,932 B1 | 9/2002 | Baldassar et al. |
| 8,658,100 B2 * | 2/2014 | Biswas ................. C10G 47/24 422/620 |

* cited by examiner

*Primary Examiner* — Randy Boyer

(57) ABSTRACT

The invention relates to an improved system and method for relief of hot, high pressure, fouling fluid from the $1^{st}$ Stage Reactor and the ISS in case of an unintended overpressure situation while allowing the quick establishing of normal fluid flow path once the overpressure situation has been corrected. This allows for rapid cooling of all subsequent reactor stages while minimizing VGO slop generation that needs reprocessing.

6 Claims, 2 Drawing Sheets

OVERPRESSURE PROTECTION IN HOT HIGH PRESSURE PROCESSING SYSTEMS IN MULTI-STAGE UP-FLOW REACTOR SYSTEMS

FIELD OF THE INVENTION

Hydrocracking is a major source of jet fuel, diesel, naphtha, and liquefied petroleum gas. Hydrocracking is a catalytic cracking process assisted by the presence of an elevated partial pressure of hydrogen gas. The process is operated at high temperatures (e.g 350 to 500 degrees Celsius) and high pressures (e.g., 7-25 MPa). The process involves flowing materials through a number of reactors and structures (e.g., flow control valves, pipes, etc.) any one of which can become clogged, jammed, or otherwise cause a constriction in flow that results in undesirable elevation of pressure within the system. Typically, such reactors are ebullated bed reactors, slurry reactors or multistage moving bed reactors such as those described in U.S. Pat. No. 5,916,529, which is herein incorporated by reference.

To prevent the elevated pressure from damaging components in the system, pressure relief systems and methods have been developed. The advent of inter-stage separation and stripping of the up-flow reactor effluent between two reactor stages has led to the need for overpressure protection of the first stage reactor and the Inter-Stage Separator or Inter-Stage Stripper and Separator, both hereinafter referred to as ISS or an inter-stage separator vessel. The ISS can be either a phase separator where liquid containing solids, if any, is separated from the vapor phase or an inter-stage stripper and separator system as defined in U.S. Pat. No. 6,454,932, which is herein incorporated by reference and wherein the effluent from the first stage reactor is stripped using a vapor stream injected counter-currently with the first reactor effluent across any mass transfer internals, such as packing, if any. The fluid that is relieved from the ISS has a tendency to coke and build-up fouling in stagnant areas. The coking/fouling has the potential to impede partially or block completely the fluid flow path, especially small diameter tubing and piping, further complicating the systems that can be deployed in this service. The invention relates to a system and method for relief of hot, high pressure, fouling fluid from the first stage reactor and the inter-stage separator in case of an unintended overpressure situation while allowing the quick establishing of normal fluid flow path once the overpressure situation has been corrected. The invention allows for rapid cooling of all subsequent reactor stages while minimizing vacuum gas oil slop generation that needs reprocessing.

BACKGROUND

The advent of inter-stage separation and stripping of the up-flow reactor effluent between two reactor stages, U.S. Pat. Nos. 6,454,932 and 6,270,654 has led to the need for overpressure protection of the $1^{st}$ Stage Reactor and the (ISS). The fluid that is relieved from the ISS has a tendency to coke and build-up fouling in stagnant areas. The coking/fouling has the potential to impede partially or block completely the fluid flow path, especially small diameter tubing and piping, further complicating the systems that can be deployed in this service. Prior art, such as U.S. Pat. No. 8,658,100, which is incorporated herein by reference, addresses this concern with the use of a pressure chamber containing rupture disc and routing the effluent to the downstream Hot HP Separator, from which it flows in an open path to be relieved to flare after cooling. The conventional approach to overpressure protection uses a pressure safety valve (PSV) discharging to flare requires the downstream flare header design to be capable of handling the fluid conditions and resulting in a potential loss of effluents to flaring. As such, routing of the relief fluid to process is desired to minimize flaring and loss of valuable hydrocarbons and lowering of potential emissions and minimizing the size and cost of equipment associated with the flare system.

The pressure difference between the ISS and Hot HP Separator is small and hence conventional or balanced bellows PSV cannot be used. Standard industry practice, in cases where the backpressure at the outlet of PSV is greater than or equal to 75% of the PSV set pressure, is to use either an internal or external pilot operated PSV. Due to fouling tendency of the fluid, a pilot operated PSV is not ideal in this service due to small cross sections of pilot system that have the tendency to plug due to fouling, thus necessitating the use of a rupture disc as invented in the U.S. Pat. No. 8,658,100.

The shortcoming of the prior art is that the rupture disc does not reset automatically once the overpressure situation has passed. In case of overpressure relief of ISS, the reactor safety system is engaged resulting in depressurization of the unit and stoppage of hydrogen rich treat gas to the reactors in addition to stopping the heat input to the reactors. Concurrently, the reactors are filled with Vacuum Gas Oil (VGO) material to displace the hydrogen and reactor liquid while cooling the reactor contents.

As described in U.S. Pat. No. 8,658,100, the VGO overflowing from the $1^{st}$ stage reactor bypasses the subsequent reactors and is routed directly to the Hot HP Separator. This results in excessive VGO flushing volume required to cool both the reactors and a longer time needed for cooling the second stage reactor, leading to an increased risk of substantial coke formation in that reactor and extended downtime for clean-out.

In light of the above, Applicants have disclosed an invention comprising an efficient and effective processing scheme for relief of hot, high pressure, fouling fluid from the first stage reactor and the ISS in case of an unintended overpressure situation while allowing the quick establishing of normal fluid flow path once the overpressure situation has been corrected. The invention allows for rapid cooling of all subsequent reactor stages while minimizing vacuum gas oil slop generation that needs reprocessing.

These and other features of the present invention will be more readily apparent from the following description with reference to the accompanying drawings.

SUMMARY OF THE INVENTION

It is an object of the invention to achieve routing of relief fluid to downstream process equipment, specifically, the Hot MP Separator or Hot LP Separator or Fractionation section. This is accomplished by utilizing conventional or balanced bellows PSV for pressure relief of ISS and $1^{st}$ Stage Reactor contents and the PSV inlet line is purged using either the hydrogen rich gas from compressor discharge or hot VGO purge material that is also used to purge the reaction section lines and instruments in fouling service.

More particularly, the present invention provides a hydrocracking process utilizing more than one hydrocracking reactors connected to one or more inter-stage separator vessels, a method for efficiently and effectively relieving high pressures between a hydrocracking upflow reactor and an inter-stage separator vessel and subsequently allowing the system to be placed in safe condition for restart of normal operation comprising:
  a) feeding a first hydrocarbon feedstream and a first hydrogen stream to a first hydrocracking up-flow reactor wherein the reaction zone of said first hydrocracking upflow reactor comprises a liquid phase and a vapor phase, to create a hydrocracked hydrocarbon stream; and
  b) separating said liquid phase and said vapor phase from said hydrocracked hydrocarbon stream in an inter-stage separator vessel into a vapor phase stream and a liquid phase stream; and
  c) feeding said liquid phase stream, under normal operating conditions, to a first control valve; and
  d) feeding said vapor phase stream, under normal operating conditions, to a second control valve; and
  e) feeding said liquid phase stream from the said first control valve to a second hydrocracking upflow reactor; said second upflow hydrocracking reactor operating at a lower pressure than said first hydrocracking upflow reactor, and wherein, in response to pressure increase in the said first hydrocracking upflow reactor or said inter-stage separation vessel caused by the constriction of flow or blockage of said liquid stream in said first control valve or said vapor stream in said second control valve:
    i. a portion of said liquid phase stream and said vapor phase stream is sent, along with a second hydrogen purge stream, to a pressure relief system comprising an inlet line, a pressure relief device and an outlet line, wherein the pressure at said outlet line of said pressure relief system is less than seventy-five percent of the set pressure of said pressure relief device and said outlet line discharges said portion of said liquid stream, said vapor stream and said second hydrogen purge stream to a system, with the system comprised of equipment, valves, piping, etc., that in normal operation processes at least portion of the effluent from the said hydrocracking reactors to a downstream system operating at a lower pressure than said inlet line of said pressure relief device system thus preventing exceeding of the maximum design pressure in said first hydrocracking upflow reactor and said inter-stage separation vessel; and
    ii. the flow of said first hydrocarbon feedstream and said hydrogen stream to said first hydrocracking upflow reactor and said liquid phase stream to said second hydrocracking upflow reactor is displaced with a second hydrocarbon feedstream; said second hydrocarbon feedstream having lower concentration of contaminants than said first hydrocarbon feedstream in said first hydrocracking upflow reactor and the said liquid phase stream in said second hydrocracking upflow reactor; and
  wherein steps e) i. and e) ii. result in prevention of overpressure in said first hydrocracking upflow reactor and said inter-stage separator vessel to levels above maximum design pressure of said first hydrocracking upflow reactor and said inter-stage separator vessel; and further wherein upon conclusion of the overpressure event in the said first hydrocracking upflow reactor and said inter-stage separator vessel:
    iii. said pressure relief valve device system automatically closes; and
    iv. the total fluid flow to said second hydrocracking reactor is a combination of liquid displaced from said first hydrocracking reactor in form of said liquid phase stream from said inter-stage separator vessel and along with said second hydrocarbon feedstream routed directly to second stage reactor,
  resulting in a return to a condition where the overall feedstream flow path is the same as normal operating conditions in said hydrocracking process.

DETAILED DESCRIPTION OF THE INVENTION

Figure 1:
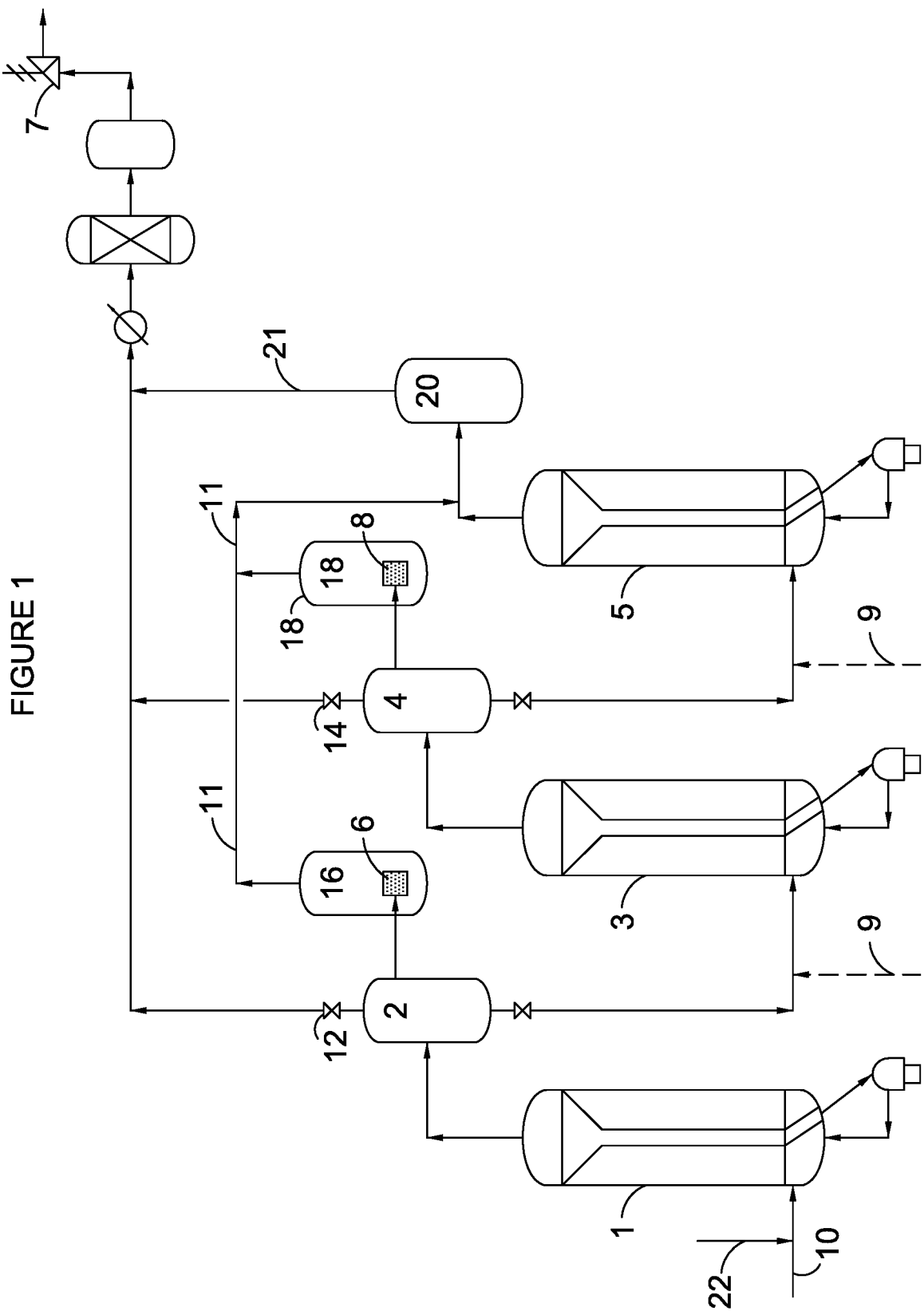
FIG. 1 is a schematic showing a hydrocracking process with the state of the art pressure relief system that relives fluid internally to the process to avoid hot relief requiring complex flare management system.

FIG. 1 is a schematic showing a hydrocracking process with a current state of the art pressure relief system that relives fluid internally to the process to avoid hot relief requiring complex flare management system. Such a process is described in more detail in U.S. Pat. No. 8,658,100, which is herein incorporated by reference.

In FIG. 1 a plurality of high pressure reactors 1, 3, and 5 are arranged in series for processing a slurry comprising a hydrocarbon feed and hydrogen; providing separators 2 and 4 connected between high pressure reactors 1, 3, and 5 configured to separate vapors from the slurry and provides a relief system wherein a rupture disk 6 and 8 is designed to actuate or rupture in response to an increase in pressure to the maximum design pressure of the said system due to a flow constraint condition, which allows fluid to flow from the ISS 2 and 4 to a downstream high pressure system thereby relieving undesirable upstream pressure.

FIG. 1 further shows a last downstream separator 20 positioned downstream of the last high pressure reactor 5 of the plurality of high pressure reactors 1, 3, and 5. The last downstream separator 20 is in fluid communication with a downstream fluid path 21 that is free of flow valves and is substantially free of slurry or conveys very low amounts of slurry. In general, the pressure in the downstream fluid path 21 is less than the pressure in any one of the plurality of high pressure reactors 1, 3, and 5, and is substantially equal to the pressure in the downstream most separator 20.

The high pressure reactors 1, 3, and 5 convert a portion of the said hydrocarbon feed to lower boiling point hydrocarbons, thereby creating a mixture of unconverted hydrocarbon feed oil, hydrogen, conversion products and (in the case of a dispersed catalyst) slurry catalyst. When the system is operating normally (i.e., no flow constriction or blockage that causes unexpected pressure increases), the slurry exiting the separators 2 and 4 is mixed with additional hydrogen before entering the downstream high pressure reactor 3 or 5. In addition, the vapor from the separators 2 and 4 are routed downstream through flow valves 12 and 14 under differential pressure control.

To protect against catastrophic high pressure in the reactors, a rupture disk 6 is configured within high pressure chamber 16 (and 8 within 18) that is in fluid communication with the ISS unit 2 and 4. The pressure in the high pressure chamber on a first side of the rupture disk 6 and 8 can be different than the pressure in the high pressure chamber on a second side of the rupture disk. When the rupture disk ruptures, flow is directed from the separator 2 through the high pressure chamber 16 containing the rupture disc 6 to a downstream high pressure system (same for separator 4 flowing through chamber 18 and rupture disc 8).

Rupture discs 6 and 8 are set to rupture between 0.7-2.7 MPa differential pressure. The relief fluid from the upstream system is routed to the inlet of the last separator 20 with the flow path of relief fluid free of any obstruction to the PSV on the Cold HP Separator 7.

In case of rupture of the rupture disc 6, phase separation in the reactors 3 and 5 can occur resulting in slumping of the ebullated catalyst bed and a loss of isothermal condition in the subsequent reactors. In this scenario, a reactor cutback sequence is activated, including replacing the reactive feed with VGO boiling material to the reactors 3 and 5 through dedicated quench lines 9 and stopping hydrogen stream 22 to reactor 1.

During the fill-up and cooling of the reactors, as the rupture disc is ruptured previously, the material from the reactor 1 flows through the first ISS 2, followed by rupture disc 6 and outlet piping 11 and thus bypassing the subsequent reactors and separators.

This results in large volumes of VGO required for flushing and cooling that will need to be reprocessed thus increasing both the capital expenditures and operating expenditures for the design and operation. Another disadvantage of prior art is that the reactor cooling step takes longer, thus increasing the unit down time and reducing the unit on-stream time due to each upset.

Figure 2:
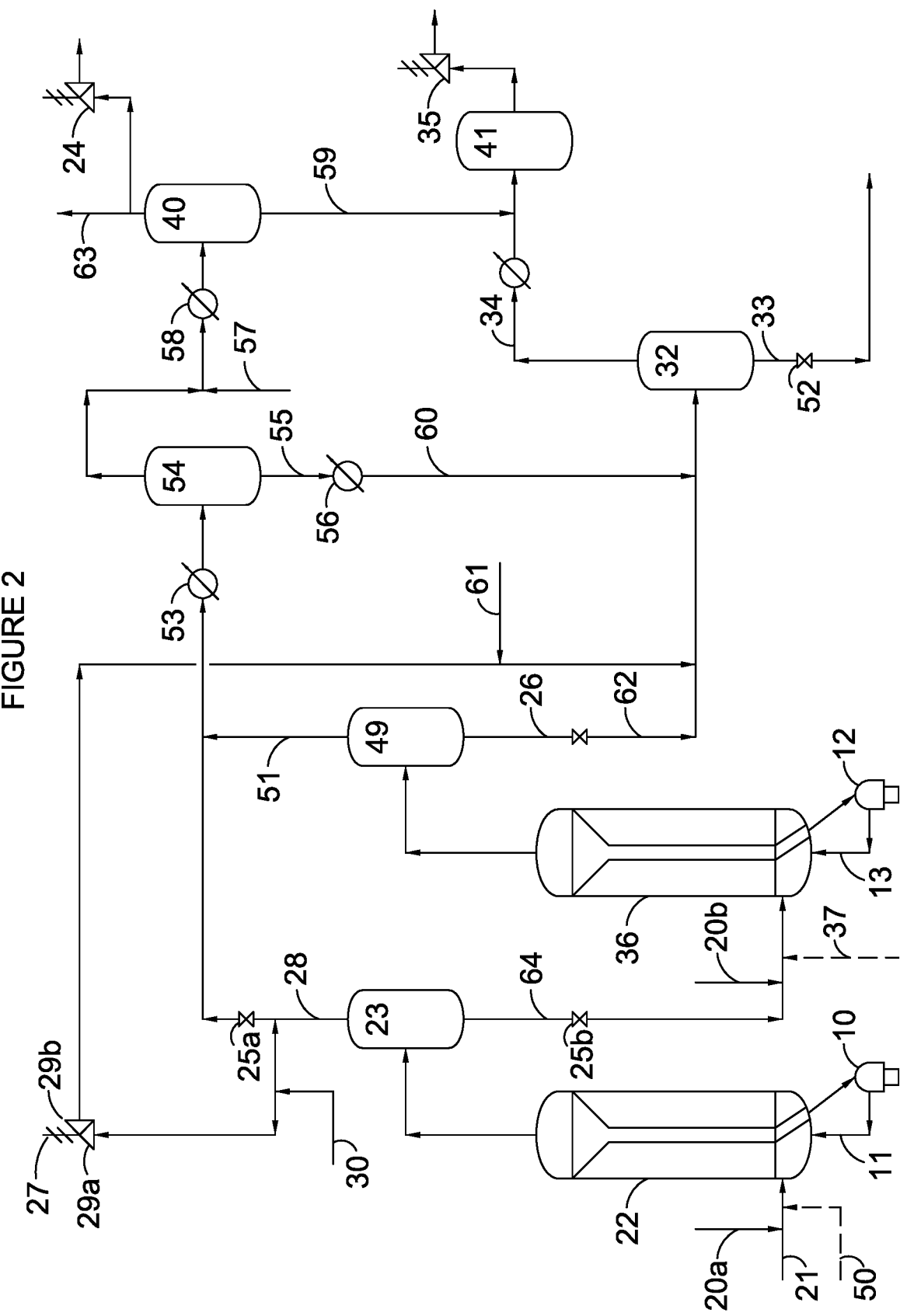
FIG. 2 is a schematic showing a hydrocracking process with Applicants improved pressure relief system according to the principles of the present disclosure.

FIG. 2 is a schematic showing a hydrocracking process with Applicants improved pressure relief system according to the principles of the present disclosure. In FIG. 2, a reactive feedstream 21 with a hydrogen rich stream 20a are fed to the first hydrocracking reactor unit 22. The reactive feedstream may contain atmospheric residue, visbreaker residue, vacuum residue, FCC slurry oil, aromatics extract, deasphalted oil (DAO) or deasphalter pitch, coal slurry, coal tar, catalyst slurry or any blend of these fluids. In part because of the contaminants present in the fluid, these fluids have a tendency to foul and potential to block flow path in stagnant part of the system at high temperatures. Typical feed considered having high contaminants content and having coking tendency is defined as a combination of the stream type, aromatics content that can be estimated by API gravity of the fluid, and coke precursor components as defined by Conradson Carbon Residue (CCR) or asphaltenes content.

An example of reactive feed source streams and corresponding contaminants content are shown in Table 1 below:

TABLE 1

| Property | Units | Test Method | VR | FCC Slurry Oil | Range of contaminants for high fouling tendency |
| --- | --- | --- | --- | --- | --- |
| API Gravity | °API | ASTM D4052 | 6 | 0.5 | <10 |
| CCR | w % | ASTM D189 | 22 | 6 | >1 |
| C7 Asphaltenes | w % | IP 143 | 20 | 0.5 | >0.05 |

During normal operation, the hydrocarbon feedstream 21 is combined with hydrogen 20a and internal recycle 11 from the ebullating pump 10 required for processing objectives and hydrocracked in the first hydrocracking reactor unit 22. This invention particularly applies to hydrocracker units with one or more inter-stage separator units (ISS) as described, for example, in U.S. Pat. Nos. 6,454,932 and 6,270,654 both of which are herein incorporated by reference. The first hydrocracking reactor unit 22 and the ISS 23 operate at temperatures and pressures of between 350° C. to 440° C. and 9 MPa-19.0 MPa. In normal operation, first hydrocracking reactor 22 is maintained in near isothermal condition by recycle of reactor liquid effluent 11 which is recycled using the first reactor ebullating pump 10. The effluent from the first hydrocracking reactor 22 is routed to the ISS 23 where the liquid 64 is separated from the vapor phase 28. The PSV 27 is closed during normal operation and hence the purge medium 30 is combined with ISS vapor 28 and routed to effluent cooling through pressure regulator device 25a, such as a pressure differential control valve. The liquid from the ISS 64 is routed to the subsequent reactors through level regulation device 25b, such as a level control valve. The ISS liquid 64 is combined with a hydrogen rich stream 20b and optionally a second liquid hydrocarbon stream (not shown) to form the feed to the last hydrocracking reactor 36.

In normal operation, last hydrocracking reactor 36 is maintained in near isothermal condition by a recycle of reactor liquid effluent 13, which is recycled using the last reactor ebullating pump 12. The effluent from last hydrocracking reactor 36 is routed to the Hot High Pressure Separator (HHPS) 49 where the liquid is separated from the vapor phase. The purpose of the HHPS 49 is the recover a high pressure vapor stream 51. This high pressure vapor stream 51 has a lower tendency to foul heat exchange equipment when cooling and is rich in hydrogen, and is combined with effluent ISS vapor 28 from the ISS 23 and, as described below, subsequently cooled to recover liquids. The remaining vapor 63 after separating from the recovered liquids 55 and 59 along with additional hydrogen stream (not shown) is thereafter compressed to feed the reactors with the required hydrogen as a part of stream 20a and 20b to first hydrocracking reactor 22 and last hydrocracking reactor 36, respectively.

During the cooling process, one or more separators can be used to separate effluent liquids from the hydrogen rich stream and be routed to the medium pressure section. An intermediate temperature separator, Warm High Pressure Separator (WHPS) 54 is operated at a sufficiently high temperature that ammonium salts precipitation does not occur in the upstream heat exchange equipment 53. The operating temperature in the WHPS is typically between 230° C.-320° C., depending on the feed impurities levels, particularly feed sulfur, nitrogen and chlorides and a pressure lower than the HHPS 49 by between 0.1 MPa-0.6 MPa.

The liquid from the WHPS 55 is further cooled in one or more heat exchange equipment 56 and routed to the HMPS 32 to control the operating temperature of Hot Medium Pressure Separator (HMPS) 32 in the desired range such that temperature is maximized in this vessel while minimizing coking due to reduction in the hydrogen partial pressure in this medium pressure system. The vapor from the WHPS 54 is combined with wash water 57, with the wash water injection design meeting various industry standards, such as API 932B, known to a person skilled in the art, and cooled in one or more heat exchange equipment 58 to maximize recovery of hydrocarbons in liquid phase 59 and increase the hydrogen concentration in the Cold High Pressure Separator (CHPS) 40 vapor phase 63.

The purpose of wash water 57 injection is to dissolve any salts that may form with reduction in temperature in order to maintain performance of the heat exchange equipment. The CHPS is typically operated between 35° C.-80° C. and at a pressure lower than the WHPS 54 by between 0.05 MPa-0.4 MPa. The CHPS is a three-phase separator with a vapor phase 63, a hydrocarbon liquid phase 59 and sour water phase (not shown). The CHPS hydrocarbon liquid 59 is routed to the Cold Medium Pressure Separator (CMPS) 41 for further processing to produce desired products in fractionation section. A pressure relieving device 24 can be located either directly on the CHPS 40 vessel or downstream on the vapor line from CHPS 40 or after further cooling or phase separators where the temperature of the fluid in normal operation is preferably lower than the HHPS 49 temperature by at least 200° C., more preferably by at least 350° C.

The high pressure vapor stream 63 from the CHPS 40 can be further concentrated in hydrogen through various means known to person skilled in the art and compressed to comprise a part of the hydrogen-rich feeds to the hydrocracking reactors, 20a and 20b. The effluent liquid from the HHPS 49 is letdown to a HMPS 32 where the effluent is cooled by mixing of one or more liquids at a lower temperature. The quench liquid is primarily cooled WHPS liquid 60 after heat exchange 56 where the temperature of the lower temperature fluid is between 60° C.-315° C. The purpose of HMPS 32 is to further recover dissolved hydrogen from the high pressure effluent streams prior to routing to downstream fractionation. This hydrogen-rich gas can be subsequently purified and compressed as discussed above to comprise part of the hydrogen feed to the reactors. The HMPS 32 typically operates between 380° C.-410° C. and preferably between 0.24 MPa-10.4 MPa, and more preferably between 2.4 MPa-6.2 MPa. The vapor from the HMPS 32 is cooled and routed to CMPS 41 where the liquid, hydrocarbon and water phases from wash water injection (not shown) are separated. One of the medium pressure overpressure protection safety devices is the PSV 35 located on the CMPS 41 vapor line. The circuit from the HMPS 32 to the said PSV 35 is free of any blockages. Alternatively, the medium pressure circuit can be protected by two PSV's, one on the CMPS 41 vapor line and another on the HMPS vapor line 34 (not shown).

The first hydrocracking reactor unit 22 and the ISS 23 require overpressure protection as the pressure safety valve (PSV) 24 on the cold high pressure (HP) separator 40 cannot be used for overpressure protection of the first hydrocracking reactor unit 22 and the ISS 23 due to the presence of potential blockages in the relief path in the control valve 25a.

In response to pressure increase upstream to said first hydrocracking reactor unit 22, the high pressure fluid 28 is, after being combined with a hydrogen rich purge stream 30, routed via large diameter piping to the Hot MP Separator (HMPS) 32 which operates at considerably lower pressure, thus allowing the ISS 23 overhead relief device 27 to be a conventional or balanced bellows type PSV. Additionally, the HMPS liquid letdown valves 52 are adequately sized such that the relief fluid from the PSV 27 can be passed through the valves to downstream process section. This prevents the overfilling of the HMPS and subsequent routing of hot fouling liquid to the flare system through PSV 35. The PSV 27 can be constituted of one or more valves depending on the sizing requirements and when multiple valves are required, staggering of PSV set pressure can be implemented. The procedures for determination of number of valves and set pressures are known to person skilled in the art.

By mitigating the use of pilot operated PSV in this circumstance, the stagnant portions of the piping are all large diameter piping at the PSV inlet 29a and outlet 29b. As such, the risk of plugging these lines and constricting or blocking flow of relief fluid is mitigated. The PSV inlet line 29a is continuously purged with hydrogen rich gas 30 from the compressor (not shown) discharge to keep the fouling fluid out of the line during normal operation. During overpressure scenario, the ISS vapor 28 combines with purge hydrogen 30 to constitute a relief fluid 31 that passes through the PSV 27. The PSV outlet line 29b is purged with hot VGO material 61 that is used to purge and flush instrumentation and stand-by equipment in this circuit. The combined relief fluid 31 and outlet line HVGO purge 61 are together routed to the HMPS inlet, either in a header combining with other streams or through a dedicated nozzle on the HMPS 32.

Consequently, if there is a loss of isothermal condition in either of the reactors, either due to loss of liquid flow to $2^{nd}$ Stage Reactor 36 due to constriction in flow of liquid through valve 25a or any of the other abnormal condition that causes the ebullated catalyst bed to slump, the feedstream 21 along with hydrogen injection is stopped and a flushing oil that is less reactive fluid with lower concentrations of contaminants and adequately high boiling point stream 50 such as a Vacuum Gas Oil (VGO) is fed to the first hydrocracking reactor unit 22 and the ISS 23.

The flushing oil selected is such that the fluid has lower tendency to vaporize at high reactor temperature and foul/coke. A marker that can be used to evaluate fouling and/or coking tendency of a fluid can be based on fouling factors that are extensively used in the industry, such as Standards of the Tubular Exchanger Manufacturers Association recommended good practice, section 10, table RGP-T-2.4. The fouling factors of feeds in normal operation and that of typical flushing fluids are summarized in the Table 2 below:

TABLE 2

| Fluid Name | Fouling Factor (m2*h*° C./kJ) | 10% ASTM D2887 Temperature (° C.) |
| --- | --- | --- |
| Vacuum Residue | 0.00049 | 510-620 |
| Visbreaker Residue | 0.00049 | 420-580 |
| Vacuum Gas Oil | 0.00015-0.00024 | 330-400 |
| Heavy Coker Gas Oil | 0.00020-0.00024 | 330-400 |

Any hydrocarbon fluid having a fouling factor of less than 0.0004 m2*h*° C./kJ and contaminants concentrations that are lower than the limits indicated in Table 1 along with an ASTM D2887 10% distillation temperature of greater than 300° C. can be considered as a flushing oil in this invention.

The relief fluid is recovered in the Hot MP Separator 32 where the vessel can serve to separate liquid 33 from the vapor 34 that contains low concentration of fouling materials and has less tendency to coke (although not expressly shown in FIG. 2, it is important to note that the vapor and liquid from the Hot MP Separator 32 has a different composition during overpressure situation then in normal operation). The relief liquid 33 is routed to downstream fractionation and recovery section via a level control device 52, such as control valves, where the effluent is separated in intermediate products that are further processed in the downstream refinery or petrochemicals complex. The path of relief vapor 34 is considered obstruction free and can be relieved through the PSV 35 on the Cold MP Separator 41 after cooling. The HIVIPS liquid level control device 52 is designed such that all liquid present, including relief liquid and normal process flow, feeding the vessel can be routed to downstream fractionation section, thereby preventing overfill of vessel, which can eventually result in relief of part of this liquid through the medium pressure section PSV 35.

Thus, the overpressure protection and relief fluid handling for this feedstream flow is addressed.

The advantage of this invention is that when the overpressure event has ended, the PSV 27 set pressure on the ISS 23 vapor, the PSV 27 resets and the normal flow of reactor 22 effluent is established, which is not possible in the rupture disc design, which is currently state of the art. Any fluid entering the ISS 23 is separated in vapor and liquid phases with the vapor leaving the top bypassing the last reactor 36. The liquid is withdrawn from the bottom of the ISS 23 and routed to the last reactor 36 for hydroprocessing and further separation in a hot high pressure separator 49 into a liquid stream 26 and a gas stream 51.

This improvement helps in emergency situations that exist in such hydrocrackers after an unexpected overpressure incident. In such a situation, phase separation would occur in both reactors, leading to loss of isothermal conditions and potential for temperature excursion. To mitigate this severe consequence, the heat input to the unit is cut, hydrogen flow to the $1^{st}$ Stage Reactor 22 and Last Reactor 36 is stopped and VGO is cut-in the feed 21 to cool and flush the $1^{st}$ Stage Reactor 22 (through line 50) and the Last Reactor 36 (through line 37) in parallel. In this invention, any liquid that is routed to ISS 23 can be fed forward to the Last Reactor 36 during the VGO flush and cooling step. This results in lower amount of VGO flush circulation requirement and the time required for cooling of all reactors in the loop is reduced. Additionally, a rupture disc once ruptured needs to be replaced, while the PSV resets automatically and can be considered suitable for service immediately.

The invention described herein has been disclosed in terms of a specific embodiment and application. However, these details are not meant to be limiting and other embodiments, in light of this teaching, would be obvious to persons skilled in the art. Accordingly, it is to be understood that the drawings and descriptions are illustrative of the principles of the invention, and should not be construed to limit the scope thereof

We claim:

1. In a hydrocracking process utilizing more than one hydrocracking reactors connected to one or more inter-stage separator vessels, a method for efficiently and effectively relieving high pressures in an upflow hydrocracking reactor and an inter-stage separator vessel comprising:
   a) feeding a first hydrocarbon feedstream and a first hydrogen stream to a first hydrocracking up-flow reactor wherein the reaction zone of said first hydrocracking upflow reactor comprises a liquid phase and a vapor phase, to create a hydrocracked hydrocarbon stream; and
   b) separating said liquid phase and said vapor phase from said hydrocracked hydrocarbon stream in an inter-stage separator vessel into a vapor phase stream and a liquid phase stream; and
   c) feeding said liquid phase stream, to a first control valve; and
   d) feeding said vapor phase stream, to a second control valve; and
   e) feeding said liquid phase stream from the said first control valve to a second hydrocracking upflow reactor; said second upflow hydrocracking reactor operating at a lower pressure than said first hydrocracking upflow reactor, and wherein, in response to pressure increase in the said first hydrocracking upflow reactor or said inter-stage separation vessel caused by the constriction of flow or blockage of said liquid stream in said first control valve or said vapor stream in said second control valve:
   i. a portion of said liquid phase stream and said vapor phase stream is sent, along with a second hydrogen purge stream, to a pressure relief system comprising an inlet line, a pressure relief device and an outlet line, wherein the pressure at said outlet line of said pressure relief system is less than eighty-five percent of the set pressure of said pressure relief device and said outlet line discharges said portion of said liquid stream, said vapor stream and said second hydrogen purge stream to a system that in normal operation processes at least portion of the effluent from the said hydrocracking reactors to a downstream system operating at a lower pressure than said inlet line of said pressure relief device; and
   ii. the flow of said first hydrocarbon feedstream and said hydrogen stream to said first hydrocracking upflow reactor and said liquid phase stream to said second hydrocracking upflow reactor is displaced with a second hydrocarbon feedstream; said second hydrocarbon feedstream having lower concentration of contaminants than said first hydrocarbon feedstream in said first hydrocracking upflow reactor and the said liquid phase stream in said second hydrocracking upflow reactor; and wherein steps e) i. and e) ii. result in prevention of overpressure in said first hydrocracking upflow reactor and said inter-stage separator; and further wherein upon conclusion of steps e) i. and e) ii:
   iii. said pressure relief device automatically closes; and
   iv. the total fluid flow to said second hydrocracking reactor is a combination of liquid displaced from said first hydrocracking reactor in form of said liquid phase stream from said inter-stage separator vessel and along with said second hydrocarbon feedstream routed directly to second stage reactor;

resulting in a return to a condition where the overall flow path is the same as described in 1 a) through d) and initial part of 1.e) in said hydrocracking process.

2. The process of claim 1 wherein said first hydrocracking up-flow reactor and said second hydrocracking upflow reactor contain a solid phase, said solid phase comprising an ebullated catalyst bed, a dispersed catalyst that is fed to said hydrocracking reactors with said hydrocarbon feed in a slurry, or a moving catalyst-bed.

3. The process of claim 1 wherein there are more than two hydrocracking upflow reactors connected in series with one or more inter-stage separator vessels.

4. The process of claim 1 wherein said inter-stage separation vessel is a stripper unit.

5. The process of claim 1 wherein said hydrocarbon feedstream contains hydrocarbon soluble molybdenum catalyst precursors.

6. The process of claim 1 wherein said first hydrocarbon feedstream is a coal slurry comprised of granular coal particles and recycle donor solvent.

* * * * *